Feb. 24, 1942.    F. E. KELLEY    2,274,147
MOTOR POT SPINDLE
Filed June 14, 1937
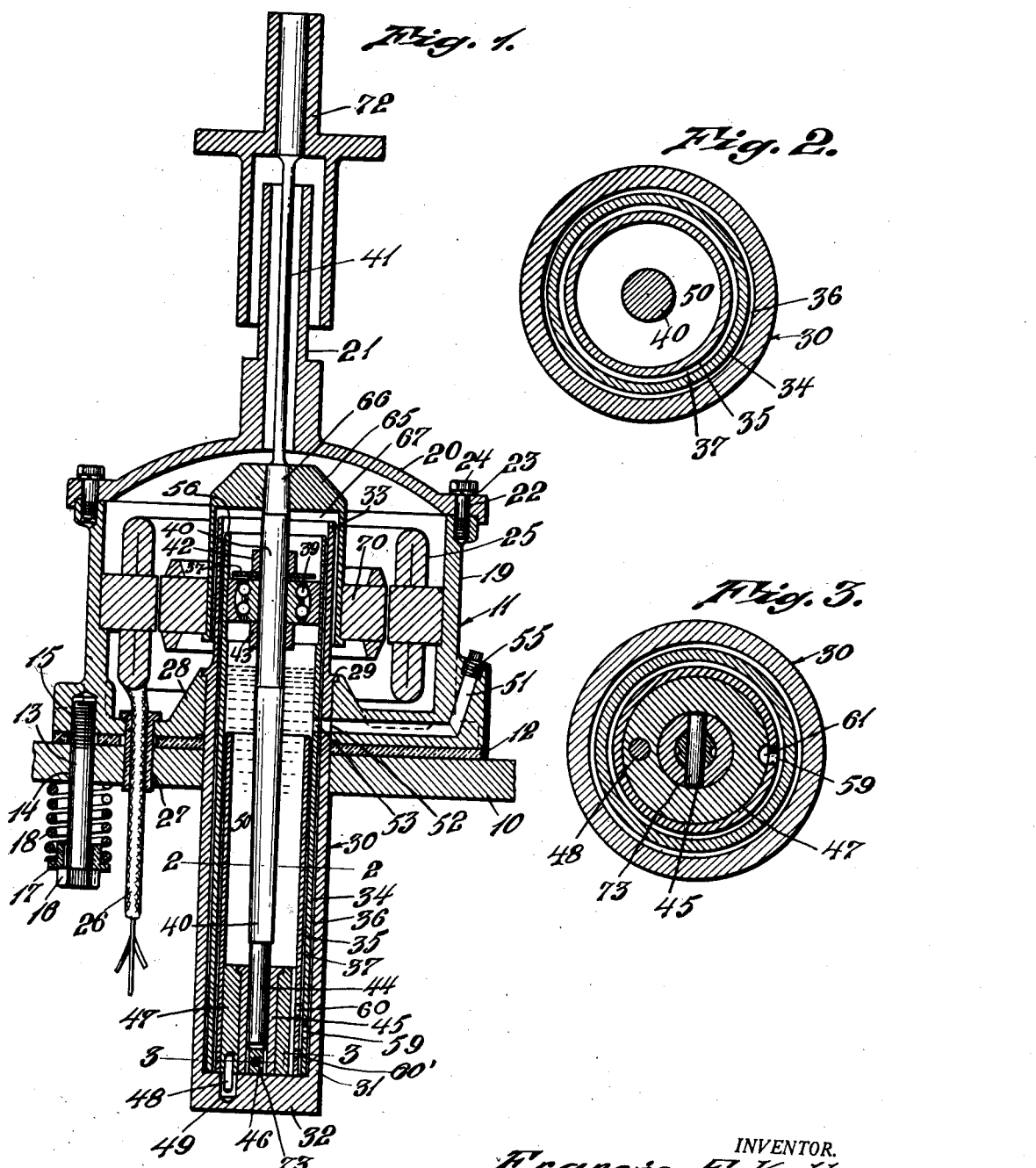
INVENTOR.
Francis E. Kelley
BY Barlow & Barlow
ATTORNEYS.

Patented Feb. 24, 1942

2,274,147

UNITED STATES PATENT OFFICE 2,274,147

MOTOR POT SPINDLE

Francis E. Kelley, Providence, R. I., assignor to Easton and Burnham Machine Company, a corporation of Rhode Island Application June 14, 1937, Serial No. 148,093

7 Claims. (Cl. 308—169)

This invention relates to a spindle mounting; and has for one of its objects the provision of a mounting for a spindle which will enable the spindle to travel at a high number of revolutions per minute, while maintaining vibrations which exist in spindles of such character at a minimum.

Another object of the invention is to control the vibration set up in the spindle by diffusing them through a plurality of separate cushions, such for instance as liquids disposed to absorb and dispense such vibrations and dampen their action and thus reduce or substantially nullify the oscillatory or gyratory motion of the spindle and cause a relatively steady smooth-running spindle.

Another object of the invention is the application of electric power at a location which will be well supported such as by a bearing for the spindle and also at such a location as to permit of the dampening action above referred to being fully and unretardedly applied.

Another object of the invention is the application of power by means of an electric motor at or about an anti-friction bearing mounting for the spindle, which mounting is a location or point about which the spindle will rock if any vibrations occur.

Another object of the invention is the provision of a plurality of sleeves with a space between the sleeves filled with liquid, which space will be of such a character that a lubricating oil will feed upwardly between the sleeves by capillary action to assist in the lubrication of the spindle mounting.

With these and other objects in view, the invention consists of certain novel features of construction, as will be more fully described, and particularly pointed out in the appended claims.

In the accompanying drawing:

Fig. 1 is a central sectional view of the spindle mounting;

Fig. 2 is a section on line 2—2 of Fig. 1;

Fig. 3 is a section on line 3—3 of Fig. 1.

The common method of mounting spindles of this type is to provide relatively fixed bearings in a case and where driven by an electric motor to position the motor at some point other than about either bearing. Vibrations exist in spindles of this character due to the unbalanced loads by reason of the ever-changing package which is rotated by the spindle, and instead of trying to eliminate vibration by building a rigid spindle which will rotate at a high number of revolutions, such as ten thousand R. P. M. in the present day practice, without vibration, I attempt to minimize and control the vibrations by absorbing and cushioning them, and I mount the spindle so that it may rock about a certain point intermediate its length and apply my driving force by means of an electric motor at this point, thus leaving the blade of the spindle, the end of which is also mounted in a bearing, so that the vibrations may be absorbed and controlled, and I control these vibrations by reason of a plurality of cushions which progressively receive and absorb these vibrations and thus minimize any vibrations which are existent at the upper end of the spindle where working occurs or the package is mounted; and I also provide that lubrication of the moving parts is desirably and suitably effected; and the following is a more detailed description of the present embodiment of this invention, illustrating the preferred means by which these advantageous results may be accomplished:

With reference to the drawing, 10 designates a support, which may be a rail or bench, which has a motor casing 11 mounted thereon through a suitable washer 12 of cork or some other vibration absorbing material. This casing is secured to the support 10 by means of stud 13 extending through a hole 14 in the support and having threaded engagement with the socket 15 of the base of the casing; while there is provided a head 16 on the stud with a collar 17 between which and the under side of the support a spring 18 acts to yieldingly hold the casing down against the support.

This casing 11 consists of a body portion 19 and a cover 20 having an upwardly extending tubular portion 21, the cover being held on the body by means of bolts 22 with lock washers 23 beneath their heads 24. Within the body portion 19 a field 25 of an electric motor is fixedly mounted in any suitable manner to which electric energy is supplied through the conduit 26 extending through the casing and support 10 and insulated therefrom by the porcelain or fiber tube 27. The base of this casing has an upwardly extending boss 28 which is recessed to receive the flange 29 of the bolster casing 30 which extends downwardly through the motor casing and support as at 31 providing a bottom 32. The bolster casing also extends upwardly above the flange as at 33.

Within this bolster casing 30 there are a pair of telescoping bolsters, the outer and longer bolster being designated 34 and the shorter and inner bolster being designated 35. The outer bolster 34 is spaced as at 36 from the casing, while the inner bolster 35 is spaced from the outer bolster 34 as at 37. The outer bolster extends just short of the top of the bolster casing and has mounted therein a ball bearing 39 for rotatably supporting the blade 40 of the spindle 41, this bearing being held on the spindle by means of suitable collars 42 and 43 located above and below the bearing for this purpose, while the ball bearing has a close and sweated fit with the outer bolster 34. The inner bolster 35 is considerably shorter than the outer bolster and provides a step bearing at its lower end for the lower end of the blade 40. This blade is reduced as at 44 and mounted within the glass hard steel sleeve 45 having a separable bottom support 46 of the same material, which is secured to the sleeve 45 by a pin 73. The sleeve has a force fit in the tube 47 which is removably mounted within the bolster 35 and prevented from rotation relative to the casing by a pin 48 extending into the tubular member and into the opening 49 in the casing. This tube may be removed from the bolster, the sleeve driven out, and the step 46 removed to be replaced if desired.

Oil or lubricant 50 is supplied through the conduit 51 in the motor casing and through the opening 52 in the bolster casing and opening 53 in the bolster 34 and is maintained at a level just beneath the closure plug 55, thus completely immersing the lower bolster in oil and maintaining the oil level below the ball bearing at the upper portion of the bolster casing. The small space between the outer bolster 34 and the bolster casing 30 is such as to permit the oil to rise to a considerable extent in the space 36 by capillary action so as to be in close proximity to the upper end of the outer bolster 34. The vibrations which occur supply a pumping action for the oil, forcing it up in this space 36 so that it flows over the top edge 56 of the outer bolster and spills down onto the ball bearing to assure its constant and full lubrication. A slinger 57 is mounted on the spindle to prevent the ball bearing from throwing any oil upwardly so that it might be spattered over the top of the bolster casing and run down the outer side of this casing to get into the motor. Suitable lubricant passages 59 and 60, 60' exist in staggered relation between the spaces 36 and 37 to enhance the pumping action and also connect with the groove 61 in the step bearing.

The spindle is relatively loosely mounted by means of the bolster having spaces between the bolster and the casing. The lower end of this bolster is more loosely mounted than the mounting in the ball bearing, and accordingly, the ball bearing mounting for the bolster serves as a pivotal point about which oscillations will occur if any vibrations are to occur in the spindle; and I utilize this pivotal point as a driving point for best applying power of an electric motor to drive the spindle. A whirl 65 is mounted on the tapered portion 66 of the spindle and its recess 67 receives the upper end of the bolster casing. The armature 70 of the motor is mounted upon this whirl 65 and serves as a driving means for the spindle when the field is excited by electric energy supplied through the cable 26. The center of the armature and the center of the ball bearing will be in the same plane at right angles to the axis of the spindle and of course the field 25 will be centralized with reference to the armature. Thus, a most advantageous point of driving the spindle is provided and one which will not deter or interfere with the desirable pivoting action of the spindle about this point.

By reason of the telescopically arranged bolster in the lower end of the spindle located in the oil reservoir a desirable double cushioning action is provided to control any vibrations which might occur in the spindle at this lower end. The primary vibrations will be absorbed by reason of the liquid in the space 37, while any secondary vibrations or those which are not absorbed by the first cushioning film will be absorbed by the outer cushioning film in the space 36 between the outer bolster and the casing. Thus, any vibrations are fractionally distributed and absorbed in these cushioning films and any oscillatory or gyratory motion of the spindle is reduced to a minimum and substantially eliminated.

The glass hard metal of chrome tool steel provides the lower step bearing for the spindle and is more fully disclosed and described in my prior Patent No. 2,041,934, granted May 26, 1936, to which reference may be had for a more detailed description.

At the upper end of the spindle there may be provided a suitable adapter 72 upon which the part of a rayon spinning pot or attachment may be mounted for rotation, or the spindle may be adapted for many and other varied purposes.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In combination, a spindle blade, a bolster casing, a plurality of bolsters in said casing, a pair of spaced bearing members for said blade, one of said bearings being secured in the upper part of the outer bolster and the other bearing being secured at the lower portion of the inner bolster, said bolsters being fitted one within another in spaced relation and located in said casing and spaced therefrom and each movable relative thereto, and an electric motor having a field and an armature, said armature mounted about said upper bearing to cause rotation of said spindle when the field is energized, said upper bearing for said spindle being mounted within said armature.

2. In combination, a spindle blade, a bolster casing having an oil reservoir, a plurality of bolsters in said casing, a pair of spaced bearing members for said blade, one of said bearings being secured in the upper part of the outer bolster and the other bearing being secured in the lower portion of the inner bolster, said bolsters being fitted one within another and movable relative to each other and relative to the casing and spaced from each other and having their lower portions located in said reservoir to provide an oil film between said bolsters and said bolster casing, and an electric motor having a field and an armature, said armature mounted about said upper bearing to cause rotation of said spindle when the field is energized, said upper bearing for said spindle being mounted within said armature.

3. In combination, a spindle blade, a bolster casing having an oil reservoir, at least two bolsters in said casing, a pair of spaced bearing members for said blade, one of said bearings being secured in the upper part of the outer bolster and the other bearing being secured in the lower portion of the inner bolster, said bolsters being fitted one within the other and spaced from each other and free to move relative to each other and relative to said casing and having their lower portions located in said reservoir to provide an oil film between said bolsters and said bolster casing and with their lower ends resting on the inner bottom surface of said bolster case, and an electric motor having a field and an armature, said armature mounted about said upper bearing to cause rotation of said spindle when the field is energized, said upper bearing for said spindle being mounted within said armature and so located that a plane at right angles to the spindle axis passes midway through the bearing and armature.

4. In combination, a spindle blade, a bolster casing having an oil reservoir, a plurality of bolsters in said casing, a pair of spaced bearing members for said blade, one of said bearings being secured in the upper part of the outer bolster and the other bearing being secured in the lower portion of the inner bolster, said bolsters being fitted loosely within one another to provide separate clearance spaces between each bolster and the outer bolster and the casing and movable therein and with the lower end portions of the bolsters extending into said reservoir to provide an oil film in each of said clearance spaces whereby said films act together to cushion the vibratory motion of the spindle, and an electric motor having a field and an armature, said armature mounted about said upper bearing to cause rotation of said spindle when the field is energized, said upper bearing for said spindle being mounted within said armature.

5. In combination, a spindle blade, a bolster casing having an oil reservoir, a pair of loosely telescopically-arranged bolsters loosely mounted in said casing, spaced bearings for said blade, said bolsters being of unequal length and having their lower end portions located in said reservoir, and with their lower ends coextensive and resting on the lower wall of said reservoir, the longer of the bolsters having the upper bearing for said blade secured therein and the latter being stepped on the lower bearing which is secured in the lower end of the other bolster, and an electric motor having a field and an armature, said armature mounted about said upper bearing to cause rotation of said spindle when the field is energized, said upper bearing for said spindle being mounted within said armature and so located that a plane at right angles to the spindle axis passes midway through the bearing and armature.

6. In combination, a spindle blade, a bolster case, a bolster loosely mounted in said bolster case, a second bolster shorter than the first bolster and loosely mounted within said first bolster, the lower end of each of said bolsters being coextensive at the bottom and resting on the inner bottom surface of said bolster case, and bearings for said spindle blade within said bolsters, one of said bearings being within the said first bolster only and above the second bolster and providing a rockable mounting for the blade about an axis adjacent to the upper bearing, the walls of said bolsters being spaced from each other and from the inner walls of said bolster casing throughout their entire length, and an electric motor having a field and an armature, said armature mounted about the bearing with the first bolster to cause rotation when the field is energized, said bearing being mounted within said armature.

7. In combination, a spindle blade, a bolster case, a plurality of bolsters loosely mounted within said bolster case and loosely mounted one within another, said bolsters being of unequal length with the lower ends of said bolsters being coextensive at the bottom and resting on the inner bottom surface of said bolster case, and bearings for said spindle blade between said spindle blade and bolsters, the upper of said bearings being within one of said bolsters and above the upper end of another of said bolsters, said bearings providing a rockable mounting for the blade about an axis adjacent to the upper bearing, the walls of said bolsters being spaced from each other and from the inner walls of said bolster throughout their entire length, and an electric motor having a field and an armature, said armature mounted about said upper bearing to cause rotation of said spindle when the field is energized, said upper bearing for said spindle being mounted within said armature and so located that a plane at right angles to the spindle axis passes midway through the bearing and armature.

FRANCIS E. KELLEY.